United States Patent [19]
Mickael

[11] Patent Number: 5,581,079
[45] Date of Patent: Dec. 3, 1996

[54] EPITHERMAL NEUTRON DETECTOR HAVING ENHANCED EFFICIENCY

[75] Inventor: Medhat W. Mickael, Sugar Land, Tex.

[73] Assignee: Western Atlas International, Inc., Houston, Tex.

[21] Appl. No.: 394,289

[22] Filed: Feb. 24, 1995

[51] Int. Cl.$^6$ ................................ G01V 5/10; G01T 3/00
[52] U.S. Cl. ..................... 250/269.4; 250/390.1
[58] Field of Search ............................ 250/390.01, 390.1, 250/269.4

[56] References Cited

U.S. PATENT DOCUMENTS

| | | | |
|---|---|---|---|
| 4,556,793 | 12/1985 | Allen et al. | 250/267 |
| 4,581,532 | 4/1986 | Givens et al. | 250/390.1 |
| 4,590,370 | 5/1986 | Mills, Jr. et al. | 250/390.1 |

OTHER PUBLICATIONS

Brochure: PDK-100: Enhance Formation Evaluation and Reservoir Monitoring with New-Generation Pulsed Neutron Capture Technology: Copyright 1994 Western Atlas International, Inc.

*Primary Examiner*—Carolyn E. Fields
*Attorney, Agent, or Firm*—Richard A. Fagin

[57] ABSTRACT

A neutron detector sensitive principally to epithermal neutrons is disclosed. In a preferred embodiment of the invention, a neutron counter is substantially surrounded by a reflector composed of material having a high neutron scattering cross section. The reflector is then wrapped in a shield which is composed of a thermal neutron absorber. In a specific embodiment of the invention, the counter, reflector and shield are mounted inside a neutron moderator which can be composed of plastic.

16 Claims, 10 Drawing Sheets

EPITHERMAL NEUTRON DETECTOR HAVING ENHANCED EFFICIENCY

BACKGROUND OF THE INVENTION

1. Field of the Invention

The present invention is related to the field of radiation detectors. More specifically, the present invention is related to a radiation detector which is primarily sensitive to epithermal neutrons.

2. Discussion of the Relevant Art

Radiation detectors include devices capable of indicating the presence of free neutrons. Devices known in the art for indicating the presence of neutrons include helium-3 (He-3) proportional counters. He-3 counters typically are filled with gas under pressure, the gas being primarily composed of the isotope of helium having an atomic mass of 3 . Neutrons entering the He-3 counter typically react with the gas in the counter in such a way as to eventually cause the gas to ionize. When the gas in the counter ionizes a measurable change is generated in an electrical voltage applied to the gas through electrodes disposed in contact with the gas in the counter. The output of the counter generally consists of voltage pulses proportional in number to the number of neutrons detected by the counter.

The He-3 proportional counter is primarily sensitive to thermal neutrons. He-3 counters can also detect some epithermal neutrons, but at much lower efficiency than the detection of thermal neutrons. The significance of the types of neutrons and the relative efficiencies with which they are counted by the He-3 counter will be further explained.

Epithermal and thermal neutrons can be generated by the interaction of higher energy neutrons with atomic nuclei of other materials. For example, materials such as earth formations which can be penetrated by wellbore drilled into the earth, can be surveyed by a logging tool comprising a source of high energy neutrons and one or more neutron detectors. Higher energy neutrons can be generated by radioisotopic sources such as Americium-b 241surrounded by a beryllium shield, or by electrically controllable pulse sources such as those described in, for example, "PDK-100" (wellbore logging tool), Atlas Wireline Services, Houston, Tex., 1992.

In such a wellbore logging tool, the high energy neutrons which are emitted from the source typically collide with the atomic nuclei of the materials forming the earth formations surrounding the wellbore. The neutrons will typically lose some of their energy content with each collision until their energy content reaches the epithermal level, and then the thermal level, whereupon these neutrons can be detected by the He-3 counter. Alternatively, thermal neutrons can be "captured" by atomic nuclei of certain materials which may be present in the earth formation, such as chlorine. Chlorine typically is present in earth formations in the form of sodium chloride dissolved in connate water. Connate water can be contained in voids, or pore spaces, which can form pan of some earth formations.

Certain properties of the earth formation can be determined by measuring the numbers of neutrons detected by the He-3 counter at a plurality of predetermined elapsed times from the generation of the high energy neutrons by the pulsed source. Alternatively, a measurement can be made of the number of neutrons detected by each one of a plurality of He-3 detectors positioned at spaced-apart locations from the source along the tool. A plurality of detectors is typically used when the neutron source is the Americium-241 type previously described, or is any other so-called "steady-state" source.

A limitation of He-3 counters for determining properties of earth formations is that He-3 counters, as previously stated, are primarily sensitive to thermal neutrons. Also as previously stated, thermal neutrons are subject to being "captured" by atomic nuclei of certain materials such as chlorine which may be present in the earth formation. Capture of thermal neutrons precludes their detection by the He-3 counter. The numbers of thermal neutrons captured by thermal absorbers such as chlorine in the earth formations is difficult to determine because the amount of chlorine in the earth formation is typically not known at the time the neutron tool is run in a wellbore. Unknown numbers of absorbed, and therefore undetected, thermal neutrons can cause erroneous determinations of the properties of the earth formations when the He-3 counter is used.

It is known in the art to determine the properties of the earth formation by measuring the numbers of epithermal neutrons present in the earth formation, the epithermal neutrons resulting from activation of the formation with high energy neutrons. As previously explained herein, epithermal neutrons have a higher energy content than thermal neutrons. Epithermal neutrons are much less susceptible to capture by chlorine or other materials which tend to capture thermal neutrons as a result of their higher energy. Epithermal neutron measurements are therefore less susceptible to error caused by undetermined chlorine concentration in some earth formations.

Using epithermal neutrons to determine properties of the earth formation requires a counter which is primarily sensitive to the epithermal neutrons. An epithermal neutron counter is described, for example, in U.S. Pat. No. 4,556,793 issued to Allen et al. The epithermal counter disclosed in the Allen patent includes the He-3 counter previously described herein, which is then enclosed first in a neutron moderating material, and then further enclosed in a "shielding" material which is capable of substantially preventing passage of thermal neutrons. The shielding material stops most of the thermal neutrons which may be present in the earth formation from entering the counter. Higher energy neutrons, which can pass through the shielding material, are reduced in energy by the moderating material. Reducing the energy of a neutron primarily means slowing down or reducing velocity. The neutrons are slowed to an energy level where they can be detected by the He-3 counter.

As previously explained, the He-3 counter is at least partially sensitive to epithermal neutrons, and the thermal neutrons are excluded from the counter by the shield, so the detector disclosed in the Allen patent responds primarily to epithermal neutrons.

A limitation to the use of the epithermal neutron detector described in the Allen patent is that the moderator changes the amount of time taken by the neutrons to reach an energy level at which their detection in the He-3 counter can occur, relative to the amount of time taken by the neutrons to reach the epithermal energy level only as a result of interaction with the earth formation. Measurements which are related to the amount of time taken for the high energy neutrons to slow down to epithermal energy levels as a result of interaction with the formation, are therefore distorted by using the detector disclosed in the Allen patent.

It is an object of the present invention to provide a neutron detector which is primarily sensitive to epithermal neutrons which does not significantly change the time distribution of the epithermal neutrons.

SUMMARY OF THE INVENTION

The present invention is a neutron detector sensitive principally to epithermal neutrons. In an embodiment of the invention, a neutron counter is substantially surrounded by a neutron reflector composed of material having a high neutron scattering cross section. The reflector is then wrapped in a shield which is composed of a thermal neutron absorber.

In a specific embodiment of the invention, the counter, reflector and shield are mounted inside a neutron moderator which can be composed of plastic.

DESCRIPTION OF THE PREFERRED EMBODIMENT

Figure 1:
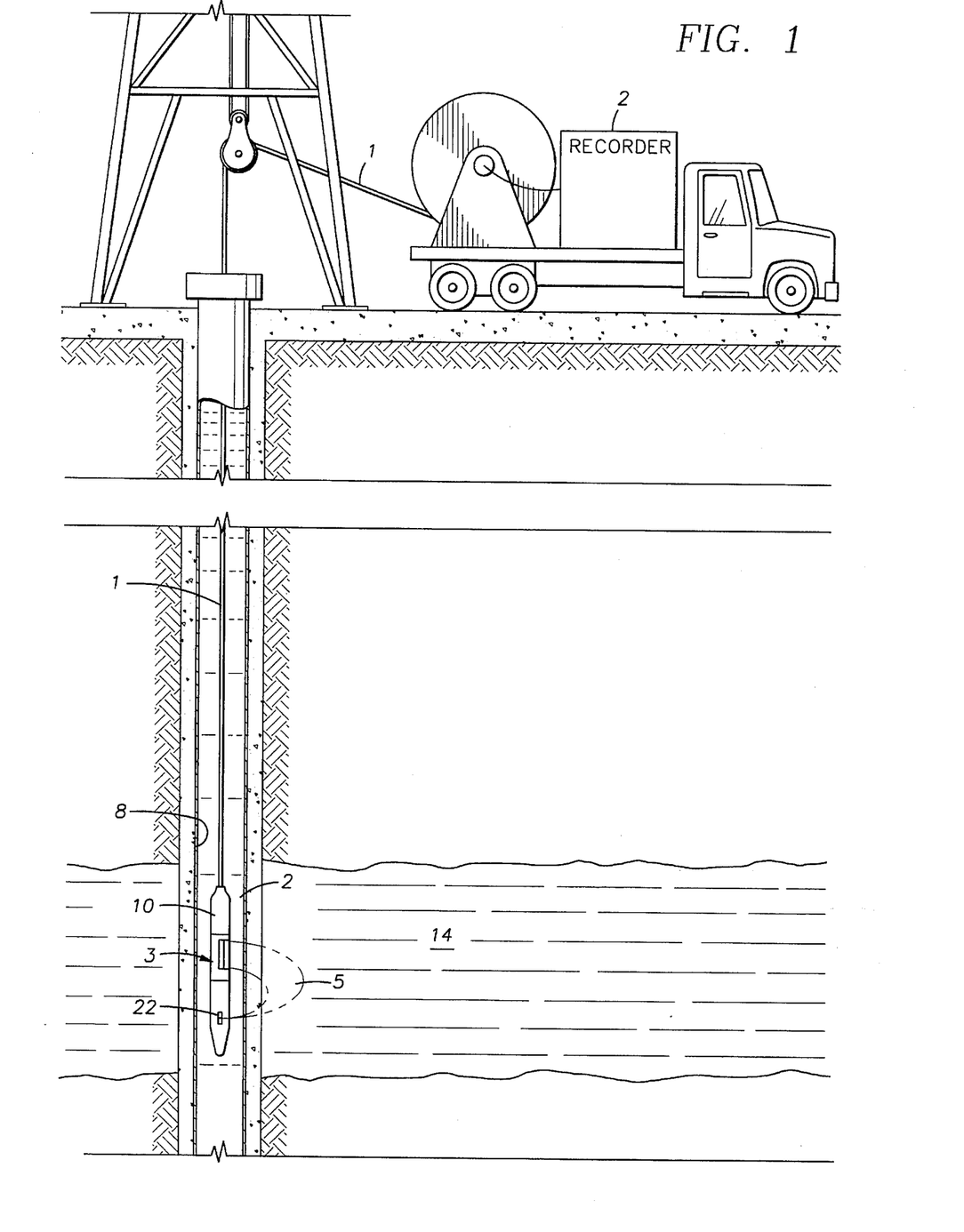
FIG. 1 shows a neutron tool disposed in a wellbore.

The operation of the present invention can be better understood by referring to FIG. 1. A logging tool 10 comprising a neutron detector 3 and a source of high energy neutrons, shown at 22, is typically inserted into a wellbore 8 penetrating an earth formation 14, the tool 10 being disposed at one end of an armored electrical cable 1. The other end of the cable 1 is electrically connected to a recorder 2 which can store and process signals generated by the detector 3 in response to detection of neutrons.

Neutrons 5 emanate from the source 22 and enter the wellbore 8. Some of the neutrons 5 enter the earth formation 14 wherein the neutrons 5 collide with atomic nuclei of the materials making up the earth formation 14. At each collision, the neutrons 5 can change direction, and some of the energy in the neutrons 5 is lost. Eventually, some neutrons 5 are reduced in energy to a level where they can be detected upon entry into the detector 3, the significance of which will be further explained.

Figure 2A:
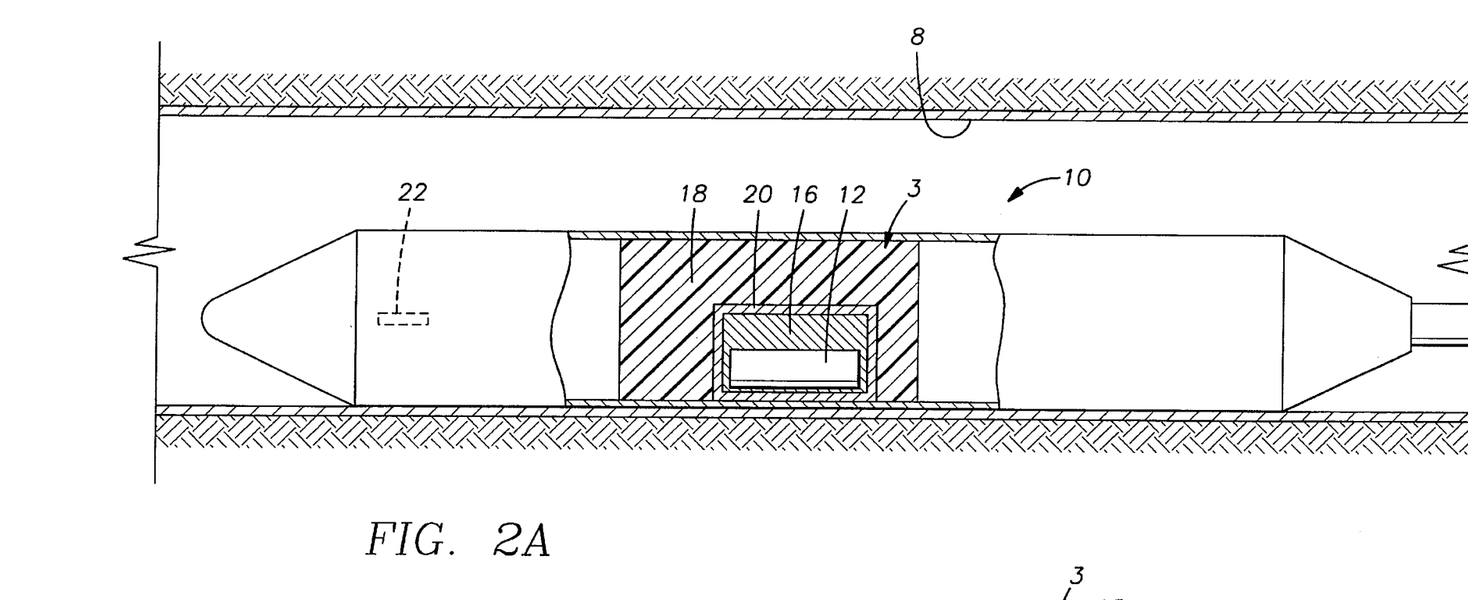
FIG. 2A shows an epithermal neutron detector according to the present invention disposed in a wellbore logging tool.

The detector according to the present embodiment of the invention is shown in FIG. 2A. The detector 3 according to the present invention can include a neutron counter such as the previously herein described He-L3 proportional counter 12. It is contemplated that other neutron counters known in the art such as lithium-6 glass counters can perform the same function as the He-3 counter described herein. As previously explained, the detector 3 is disposed within the logging tool 10 which is adapted to traverse the wellbore 8 penetrating the earth formation 14.

The counter 12 is mounted within a housing 10A, which can contain signal processing components (not shown) for transmitting measurements made by the counter 12 to the recorder (shown as 2 in FIG. 1). The detector 3 is mounted at an axially spaced apart location which is about eight inches from the source 22, which is also disposed within the housing 10A. The source 22 in the present embodiment is known in the art and is described for example in "PDK-100", Atlas Wireline Services, Houston, Tex. 1993. The source 22 periodically emits "bursts" of high energy neutrons. As previously explained, the high energy neutrons interact with the wellbore 8, which may be filled with fluid (not shown), and also interact with the formation 14 surrounding the wellbore 8.

In the present embodiment of the invention the counter 12 can be in the shape of a cylinder 1.5 inches in diameter and six inches long. The counter 12 can contain He-3 gas pressurized to ten atmospheres (about 145 PSIA).

The counter 12 is mounted within a reflector 16. The reflector 16 in the present embodiment can be composed of a material such as beryllium, carbon, aluminum or other material which has a high neutron "scattering" cross-section. A high neutron scattering cross-section means that neutrons interact with the atomic nuclei of the reflector 16 material by changing direction, but losing only a small amount of their velocity, and thereby their energy, with each interaction. Neutrons escaping from the counter 12 undetected tend to be returned to the counter 12 by interaction with the reflector 16, whereupon the reflected neutrons have additional opportunities to be detected by the counter 12.

The counter 12 is mounted eccentralized within the reflector 16 to enable entry of neutrons into the counter 12 from the formation 14, and for the counter 12 to be positioned as closely as possible to the earth formation 14. The positioning of the counter 12 within the reflector 16 will be further explained. The counter 12 and reflector 16 are wrapped in a shield 20 which can be formed from sheet cadmium metal having a thickness of about 0.025 inches. The shield 20 excludes passage of thermal neutrons into the counter 12, but enables passage of epithermal and higher energy neutrons. Since thermal neutrons are excluded from the counter 12, the neutrons detected in the counter 12 are primarily epithermal neutrons, even though the He-3 counter 12 detects epithermal neutrons at much lower efficiency than it does thermal neutrons. By providing the reflector 14 to return epithermal neutrons to the counter 12 which may escape the counter 12 undetected, the overall detection efficiency of the counter 12 to epithermal neutrons can be increased.

The assembled counter 12, reflector 14 and shield 20 are mounted eccentralized within a moderator 18. The moderator 18 can be composed of a material, such as a plastic, for example polypropylene, which has a high concentration of hydrogen nuclei in its molecular structure. The hydrogen nuclei in the moderator 18 can be struck by high energy neutrons which may enter from the wellbore 8. With each collision between a neutron and a hydrogen nucleus, a large part of the momentum of the neutron is transferred to the hydrogen nucleus. The moderator 18 therefore quickly reduces the energy of neutrons which may enter the tool 10 from the side of the tool 10 not impressed against the formation 14, so that these neutrons will be captured by the shield 20 and not enter the counter 12. The effect of the placement of the detector 3 within the moderator 18 is to reduce the effect of the wellbore 8 on the measurement made by the detector 3.

Figure 2B:
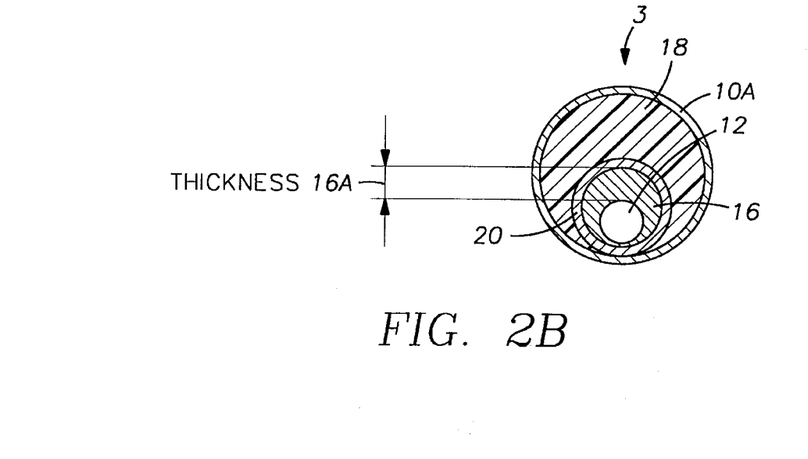
FIG. 2B shows an end view of the assembly of the neutron detector according to the present invention.

The relative mounting arrangement of the counter 12 within the reflector 16 and shield 20, and all of them then within the moderator 18, can be better understood by referring to FIG. 2B. The counter 12 is positioned inside the reflector 16 substantially axially parallel with the reflector 16. The counter 12 is also eccentered within the reflector 16 so that the exterior of the counter 12 intersects the exterior of the reflector 16 substantially on a line (not shown). The line is substantially parallel to the axes of both the counter 12 and the reflector 16. The thickness of the reflector 16, indicated at 16A, can be an amount between 0.1 inches and 0.9 inches for a counter 12 having 1.5 inch diameter. The significance of the thickness 16A will be futher explained.

The counter 12 and the reflector 16 are themselves mounted eccentralized in and substantially axially parallel with the tool housing 10A. The volume external to the shield 20 but internal to the housing 10A is occupied by the moderator 18, which as previously explained, can be composed of plastic such as polypropylene, or other material having a high concentration of hydrogen nuclei.

The counter 12, the reflector 16, the shield 20 and the moderator 18 are assembled as described herein to form the detector 3. The relative positioning as described herein of the counter 12, the reflector 16, the shield 20 and the moderator 18 provide the detector 3 with the characteristic of being directionally sensitive, which in the logging tool 10 of the present invention is primarily sensitive to epithermal neutrons which enter from the formation 14.

SIMULATION TEST RESULTS

The present invention was tested by Monte Carlo simulation. Monte Carlo simulation is known to those skilled in the art for modelling the response of interactions of subatomic particles. The simulated configuration which was tested is described in detail in the associated description of the preferred embodiment and can be seen by referring to FIGS. 2A and 2B. In all of the simulation test results described herein, the simulation included a short duration "burst" of high energy neutrons, having an equivalent energy of 14 million electron volts, emanating from the source (shown as 22 in FIG. 2A) and interacting with the formation (shown as 14 in FIG. 2A).

Results of the tests are shown in FIGS. 3 to 10 as graphs representing count rates from the detector 3 on the ordinate axes, and time elapsed from the neutron burst on the coordinate axes.

Figure 3:
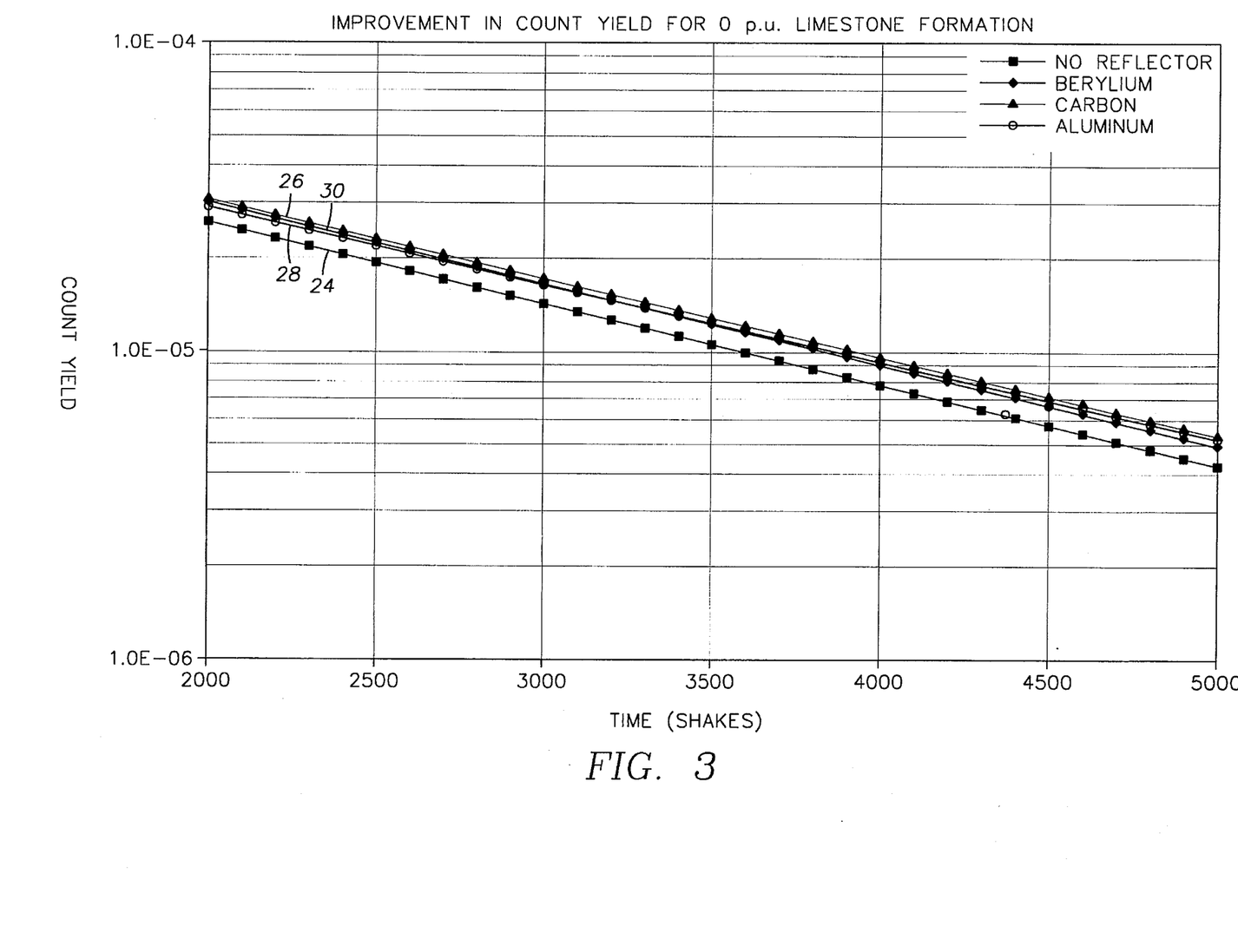
FIG. 3 is a graphic representation of Monte Carlo modeled detector counting rate versus time for the detector according to the present invention for different material compositions of a reflector with the detector positioned in a zero porosity limestone earth formation.

FIG. 3 shows a comparison of count rates for no reflector around the counter 12, shown at 24, and for carbon 26, beryllium 28, and aluminum 30 reflectors each having a 0.5 inch thickness (shown as 16A in FIG. 2B). The count rates in the graph of FIG. 3 were determined for a limestone earth formation (shown as 14 in FIG. 2A) having zero porosity.

Figure 4:
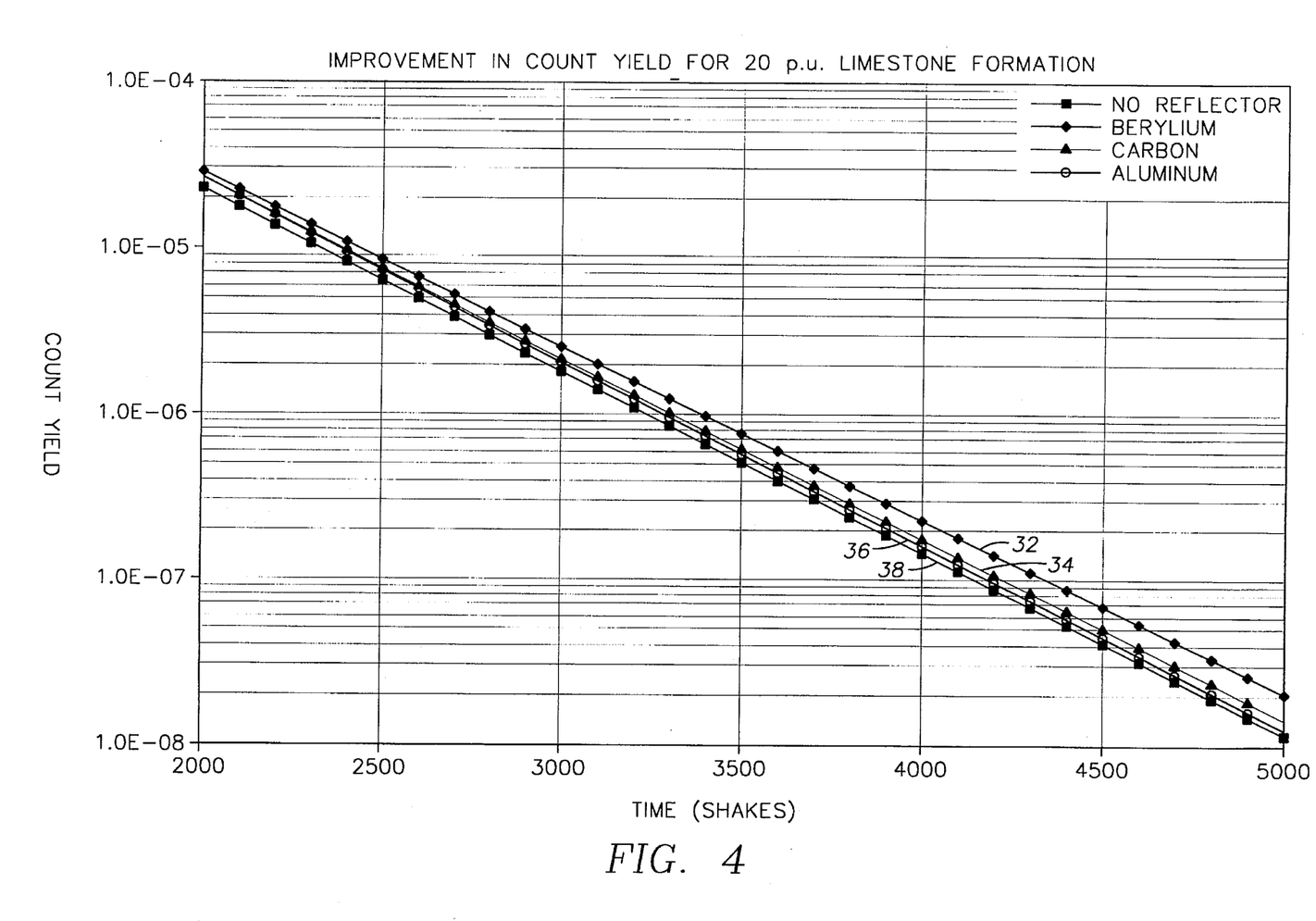
FIG. 4 is a graphic representation of the detector counting rates as in FIG. 3 with the detector positioned in a 20 percent porosity limestone formation.

FIG. 4 shows the results of a comparison of the effect of the various reflector 16 materials on detector 3 count rates when the detector 3 is positioned within a formation 14 having 20 percent porosity which is filled with water. All of the simulated reflectors 16 have 0.5 inch thickness. The curve representing no reflector is shown at 38. The beryllium reflector curve is shown at 32, the carbon reflector response curve at 34 and the aluminum reflector curve at 36.

Figure 5:
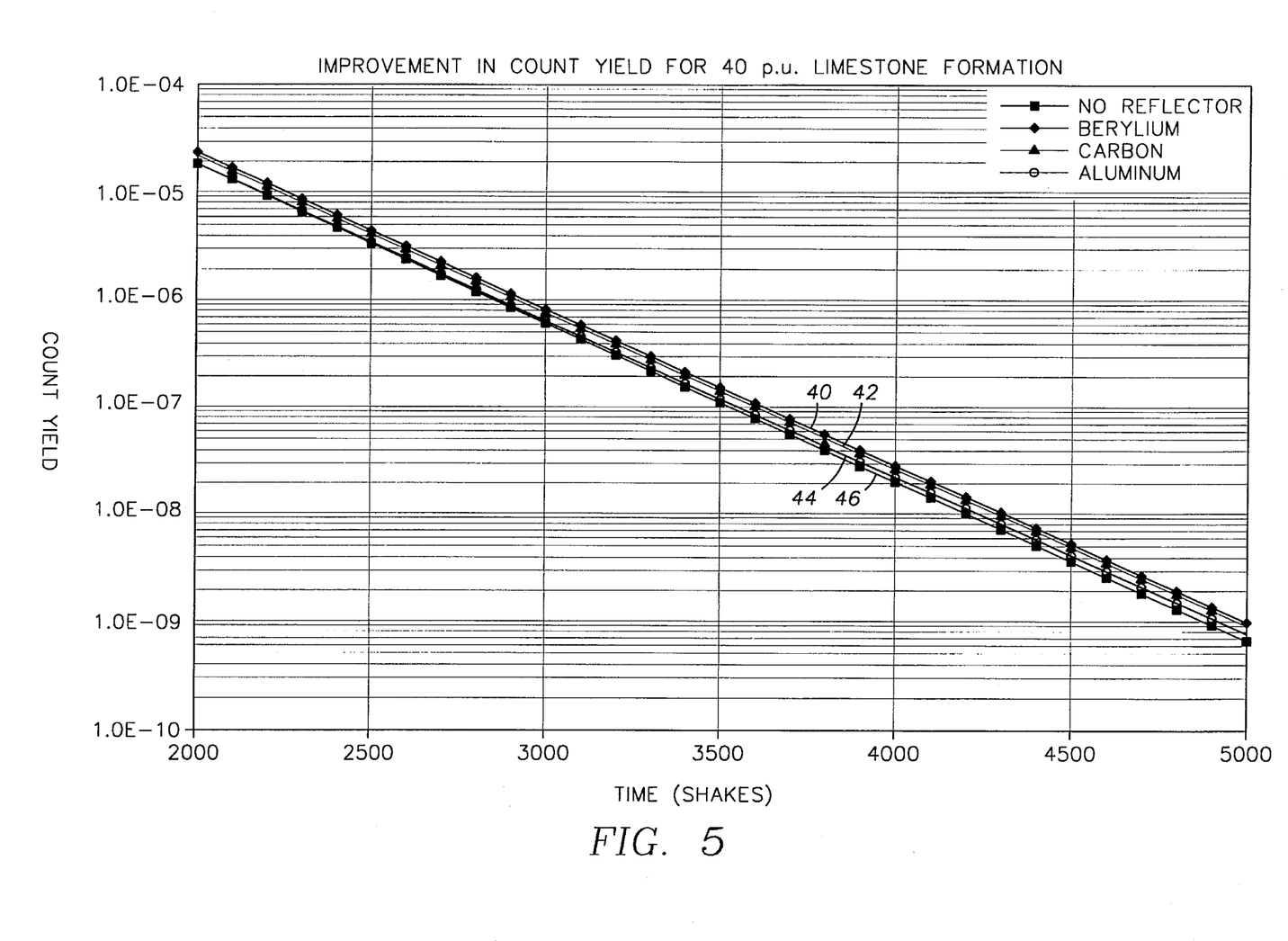
FIG. 5 is a graphic representation of the detector counting rates as in FIG. 3 with the detector positioned in a 40 percent porosity limestone formation.

FIG. 5 shows the results of a comparison similar to the comparisons shown in FIG. 4 with the exception of the detector 3 being positioned within a 40 percent water-filled porosity limestone formation 14. The curve representing no reflector is shown at 46. The aluminum reflector curve is shown at 44, the carbon reflector curve at 42, and the curve for the beryllium reflector at 40. FIG. 5 demonstrates that even within a high porosity formation, the inclusion of the reflector 16 improves the count rate of the detector 3.

Figure 6:
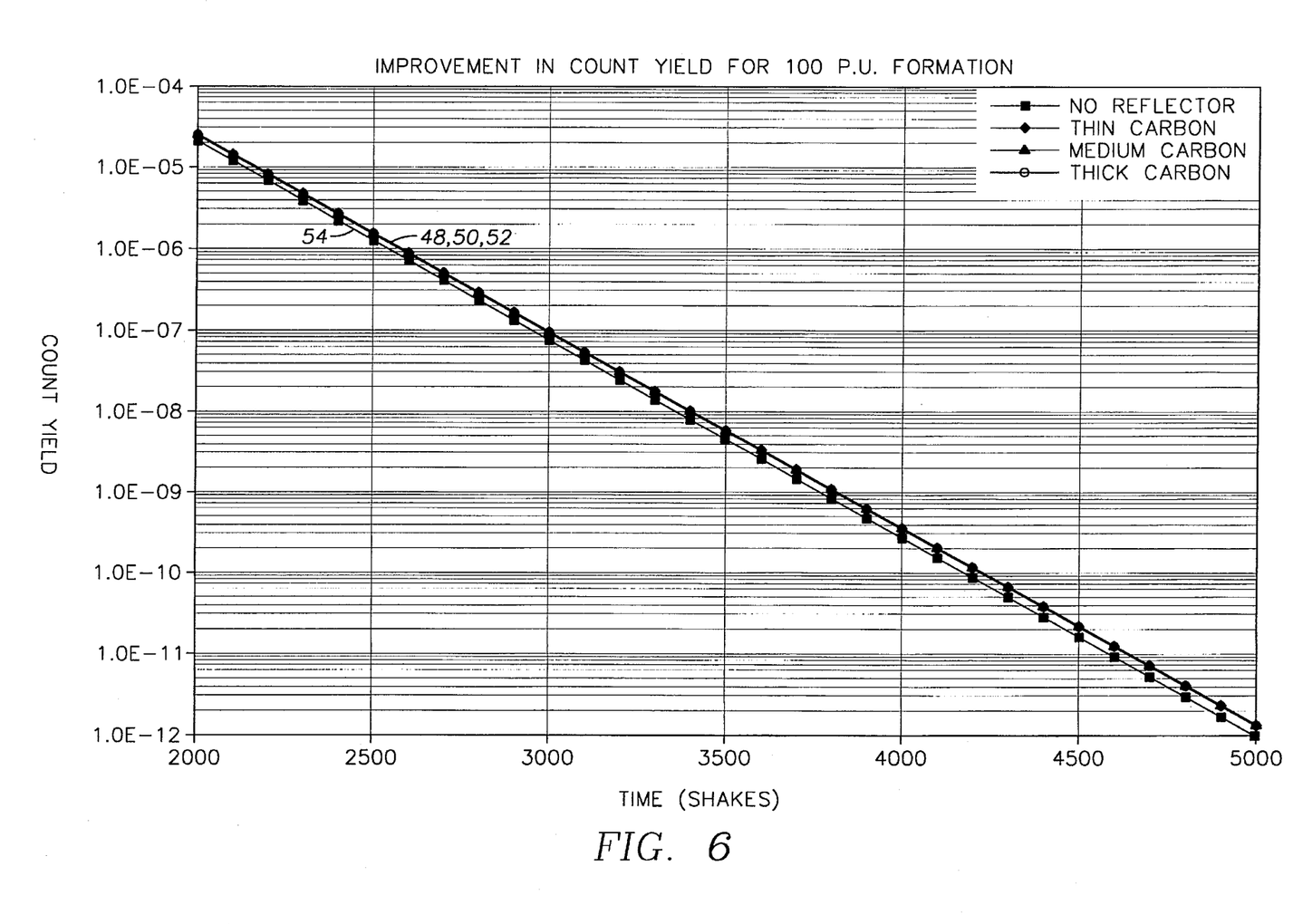
FIG. 6 is a graphic representation of the detector counting rates with the detector positioned in water, which is equivalent to 100 percent porosity.

FIG. 6 shows a similar comparison to that of FIG. 5 with the exception that the detector 3 is positioned within water, or an equivalent 100 percent porosity formation. The beryllium, carbon and aluminum curves substantially match each other as shown at 48, 50, 52, respectively, and all three curves representing count rates with a reflector are elevated above the no reflector curve shown at 54. In water (100 percent porosity) the improvement in count rate is reduced when compared with the increase in count rate generated in a lower porosity formation 14, but the increase in count rate is still visible on the graph in FIG. 6.

FIGS. 7 through 10 show the results of simulation of carbon reflectors having varying thicknesses, the thickness values being zero (no reflector), thin (0.1 inch), medium (0.5 inch) and thick (0.9 inch). The simulations were conducted for limestone formations of zero, 20, 40 and 100 percent porosity as shown in the graphs in FIGS. 7, 8, 9 and 10, respectively.

Figure 7:
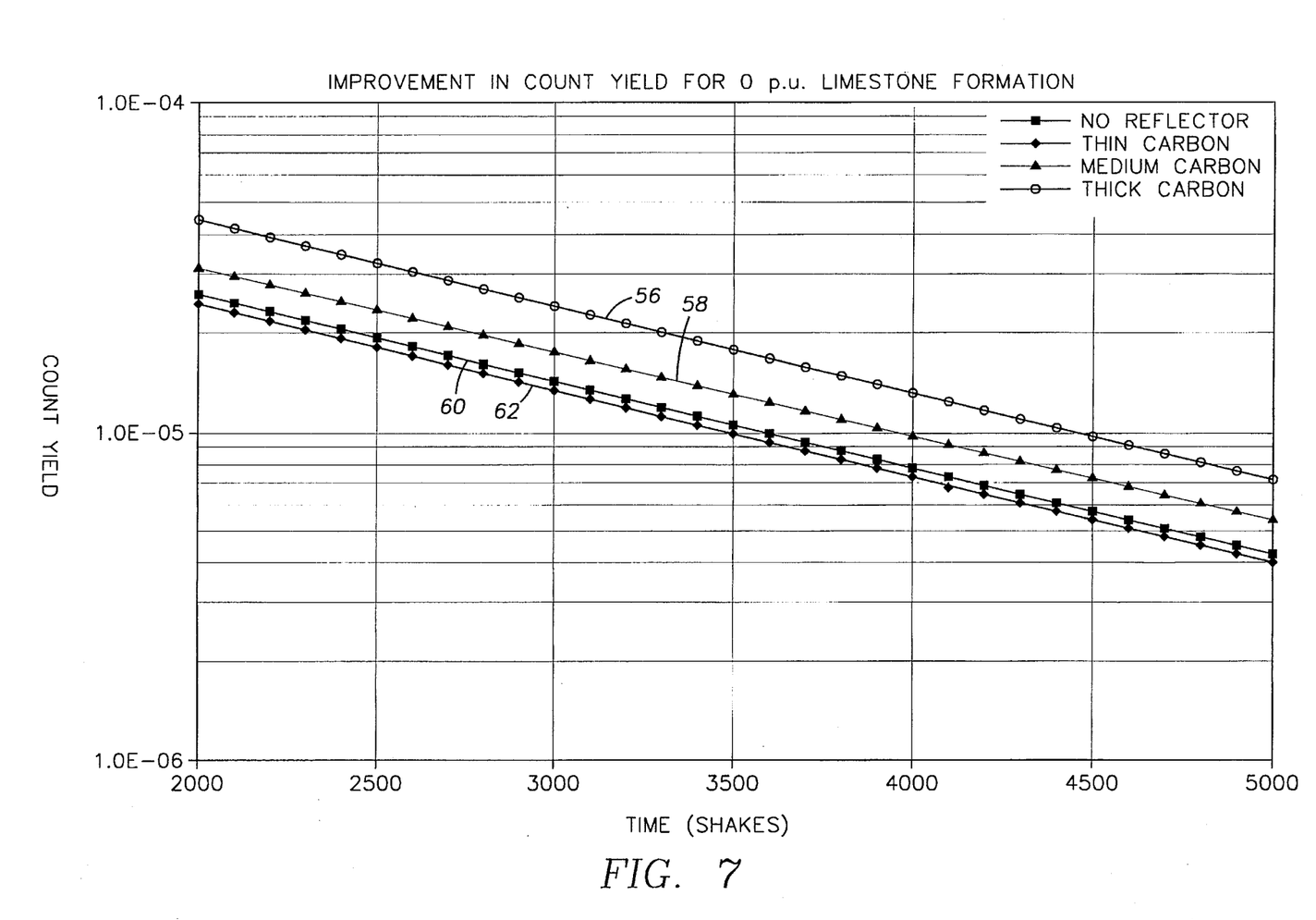
FIG. 7 is a graphic representation of Monte Carlo modeled detector count rates using reflectors of various thicknesses, with the detector positioned in a zero porosity limestone formation.

The results displayed in FIG. 7 indicate improved count detector rates as the thickness of the reflector is increased from 0.1 inch shown at 62, to 0.5 inch shown at 58, to 0.9 inch shown at 56. The 0.1 inch reflector exhibits reduced count rate relative to no reflector, shown at 60. This result is consistent within all tested values of porosity, as shown further in FIGS. 8 through 10. The explanation for this result is that a greater number of the neutrons which would otherwise enter the counter through the reflector are lost through interaction with the 0.1 inch reflector than the number of neutrons which are returned to the counter by internal reflection from within the counter. The counter with the 0.9 inch reflector, as shown generally at 56, exhibits about double the count rate of the counter with no reflector, shown at 60. For comparison, the result with the 0.5 inch reflector is shown generally at 58.

Figure 8:
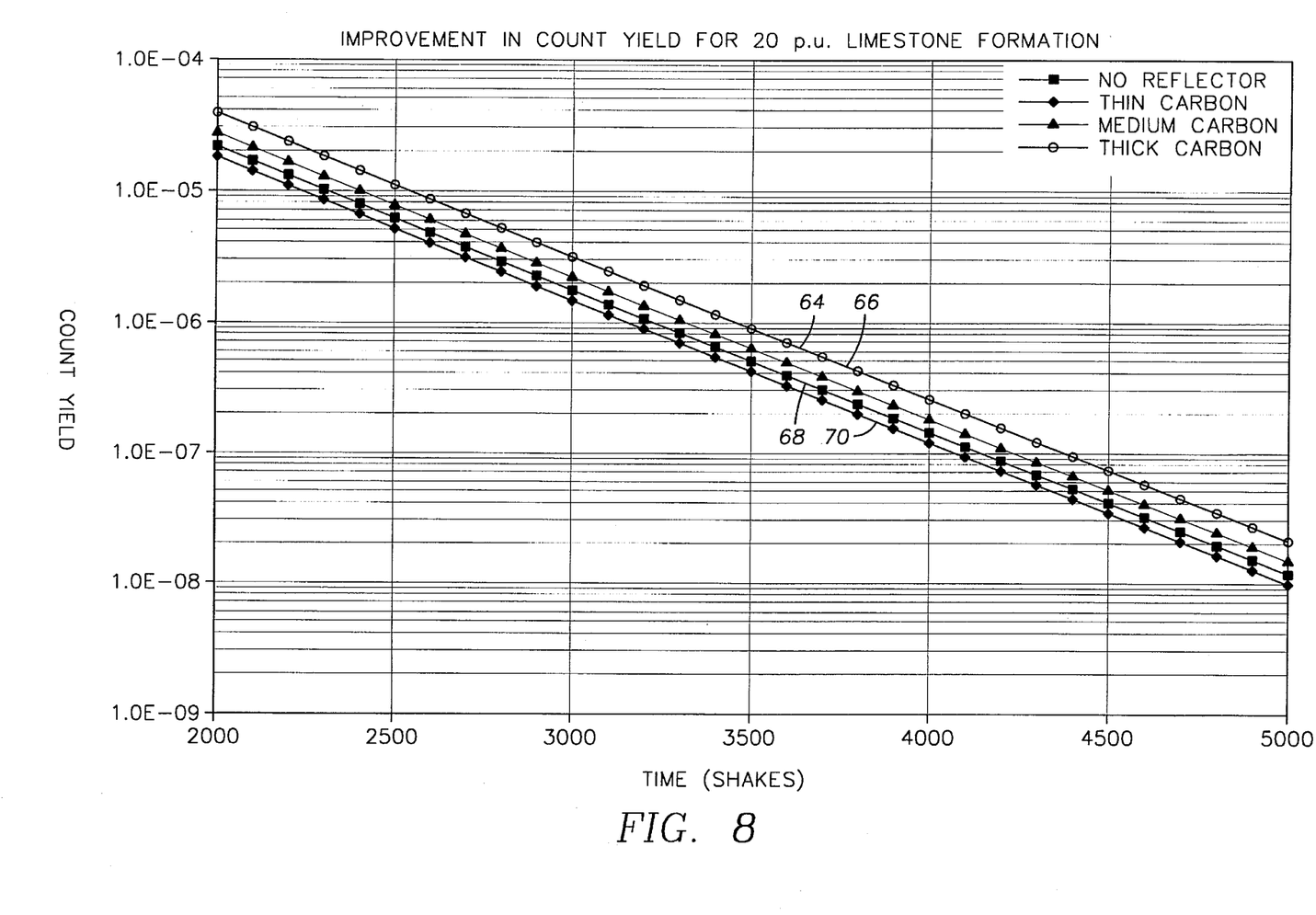
FIG. 8 is a graphic representation of the detector counting rates as in FIG. 7 with the detector positioned in 20 percent porosity limestone formation.

FIG. 8 shows the results of a comparison similar to that shown in FIG. 7 with the exception of the detector being positioned within a limestone formation having 20 percent porosity. The no reflector curve is shown at 68, and the 0.1, 0.5 and 0.9 inch reflector curves are shown at 70, 66, and 64, respectively.

Figure 9:
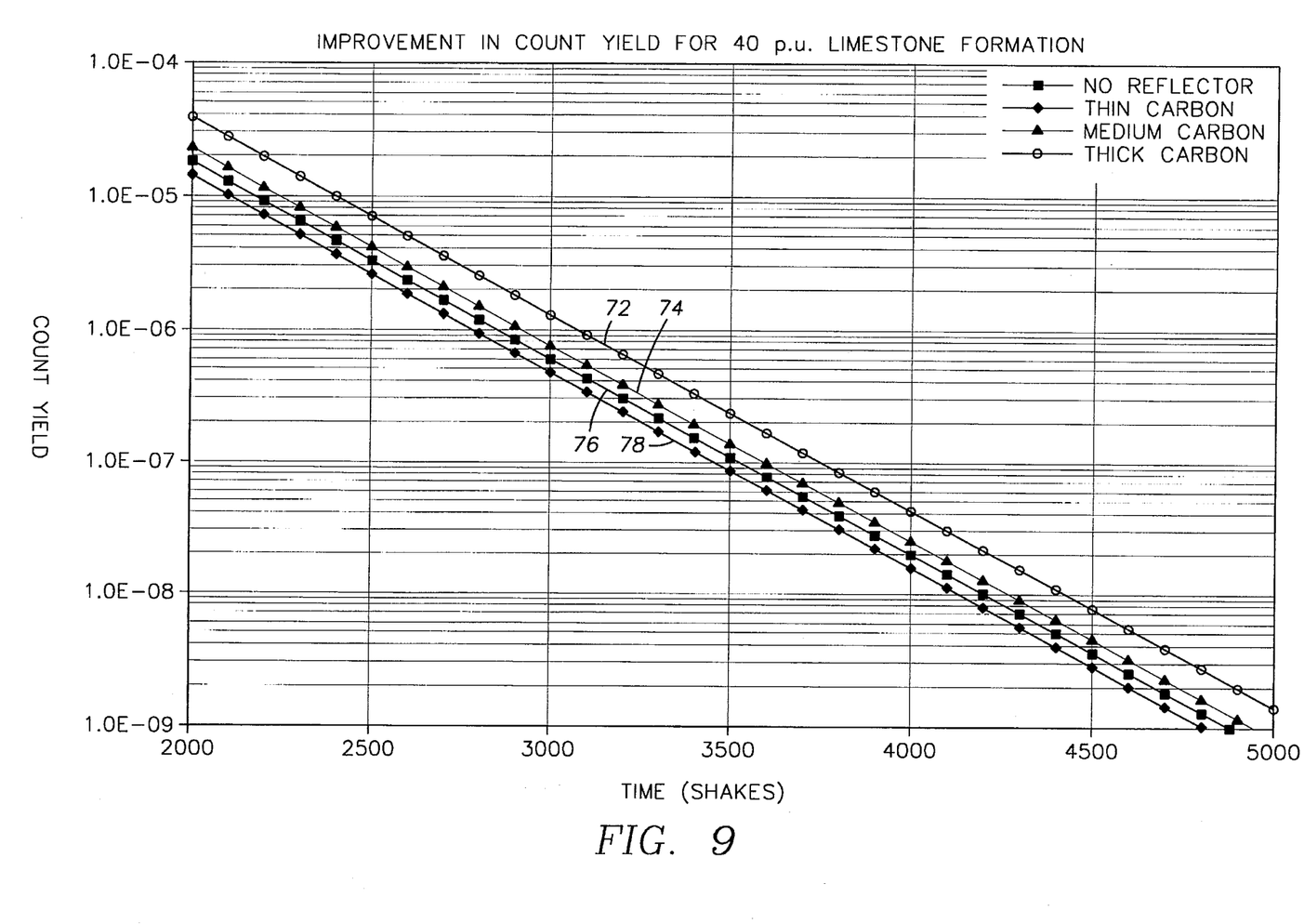
FIG. 9 is a graphic representation of the detector count rates as in FIG. 7 with the detector positioned in 40 percent porosity limestone formation.

FIG. 9 shows a similar comparison to that shown in FIG. 8 with the exception of the detector being positioned within a limestone formation having 40 percent porosity. The no reflector response curve is shown at 76, and the 0.1 inch, 0.5 inch and 0.9 inch curves are shown at 76, 74, and 72, respectively.

Figure 10:
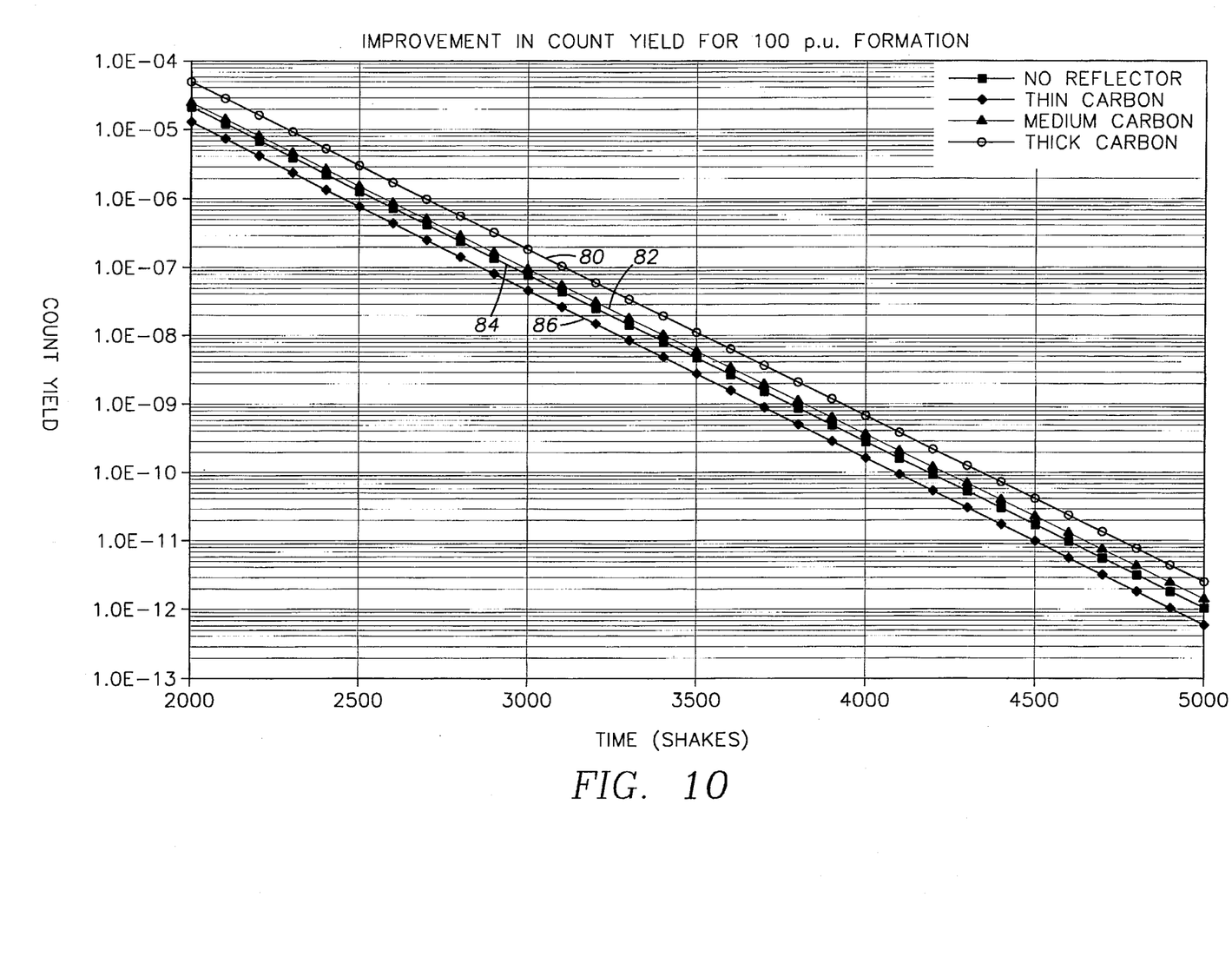
FIG. 10 is a graphic representation of the detector count rates as in FIG. 7 with the detector positioned in water.

FIG. 10 shows a comparison similar to that shown in FIG. 9 with the exception of the detector being positioned within water (equivalent to 100 percent porosity formation). The no reflector response curve is shown at 84, and the 0.1, 0.5, and 0.9 inch curves are shown at 86, 82, and 80 respectively.

In the tested cases having reflectors of 0.5 inch or greater thickness, the addition of the reflector 16 increases the count rate of the detector 3 without substantially changing the time distribution of the neutrons.

While the present invention is directed to the use of the detector within a wellbore logging tool, it is contemplated that other applications for epithermal neutron detectors would be equally well served by construction of a detector according to the present invention. The invention should be limited in scope only by the claims appended hereto.

What is claimed is:

1. A detector substantially sensitive to epithermal neutrons, comprising:

a neutron counter;

a neutron reflector substantially surrounding said counter, said reflector having the characteristic of a high neutron scattering cross-section; and a neutron shield substantially surrounding said reflector, said shield primarily composed of material which substantially absorbs thermal neutrons and allows passage of neutrons having energy above thermal level.

2. The detector as defined in claim 1 further comprising:

a neutron moderator substantially surrounding said reflector externally to said shield, said neutron moderator comprising a material having a high concentration of hydrogen nuclei in a chemical structure of said neutron moderator material.

3. The detector as defined in claim 2 wherein said neutron moderator comprises plastic.

4. The detector as defined in claim 1 wherein said neutron reflector comprises carbon.

5. The detector as defined in claim 1 wherein said neutron reflector comprises beryllium.

6. The detector as defined in claim 1 wherein said neutron reflector comprises aluminum.

7. The detector as defined in any of claims 1, 4, 5, or 6 wherein said neutron reflector has a thickness within a range of 0.5 to 0.9 inches.

8. A logging tool for making measurements of a characteristic of an earth formation penetrated by a wellbore, comprising:

a source of high energy neutrons disposed within said tool;

a neutron detector substantially disposed within said tool at a spaced-apart location from said source, said neutron detector sensitive to epithermal neutrons, said neutron detector comprising a neutron counter, said neutron counter generating an output responsive to the presence of neutrons, said neutron detector comprising a neutron reflector substantially surrounding said counter, said neutron detector comprising a neutron shield surrounding said reflector, said neutron detector comprising a neutron moderator substantially surrounding said shield wherein said neutron counter, said neutron reflector and said neutron moderator are respectively positioned so that substantially none of said reflector and none of said moderator is interposed between said neutron counter and said earth formation; and means for recording said output of said counter.

9. The logging tool as defined in claim 8 wherein said neutron counter comprises a helium-3 proportional counter.

10. The logging tool as defined claim 8 wherein said neutron reflector comprises carbon.

11. The logging tool as defined in claim 8 wherein said neutron reflector comprises beryllium.

12. The logging tool as defined in claim 8 wherein said neutron reflector comprises aluminum.

13. The logging tool as defined in claim 8 wherein said neutron moderator comprises a material having a high concentration of hydrogen nuclei within a chemical structure of said neutron moderator material.

14. The logging tool as defined in claim 13 wherein said neutron moderator comprises plastic.

15. The logging tool as defined in claim 8 wherein said source comprises a pulsed neutron source capable of generating controllable bursts of high energy neutrons.

16. A method of logging a wellbore penetrating the earth comprising the steps of:

positioning a logging tool comprising a source of high energy neutrons within said wellbore within a formation of interest;

irradiating said formation of interest with high energy neutrons from a source disposed within said wellbore;

recording an output of a neutron detector disposed within said logging tool at a spaced apart location from said source, said detector comprising a neutron counter, a neutron reflector, a neutron shield, and a neutron moderator, so that said output of said detector substantially corresponds to a number of epithermal neutrons entering said detector from said formation of interest.

* * * * *